(No Model.)

N. H. REYNOLDS.
DEGREE BOOTH.

No. 566,799. Patented Sept. 1, 1896.

Witnesses.
Mabel A. Jones,
A. Allger,

Inventor.
Noah H. Reynolds
By Ithiel J. Cilley
Attorney.

UNITED STATES PATENT OFFICE.

NOAH H. REYNOLDS, OF GRAND RAPIDS, MICHIGAN, ASSIGNOR OF ONE-HALF TO THE HENDERSON AMES COMPANY, OF KALAMAZOO, MICHIGAN.

DEGREE-BOOTH.

SPECIFICATION forming part of Letters Patent No. 566,799, dated September 1, 1896.

Application filed December 30, 1895. Serial No. 573,801. (No model.)

*To all whom it may concern:*

Be it known that I, NOAH H. REYNOLDS, a citizen of the United States, residing at Grand Rapids, in the county of Kent and State of Michigan, have invented certain new and useful Improvements in Portable Degree-Booths, of which the following is a specification.

My invention relates to improvements in portable booths or compartments for use in initiating candidates in certain degrees of Free Masonry and other secret societies, and its objects are, first, to provide a booth that may be readily and conveniently manipulated by one man; second, to provide a booth that may be readily divided into several compartments; third, to provide a booth that may be collapsed or folded into a small space for moving from place to place, and, fourth, to dispense with cross girths or braces across the bottom of the booths that the candidate is likely to trip against. I attain these objects by the mechanism illustrated in the accompanying drawings, in which—

Figure 1:
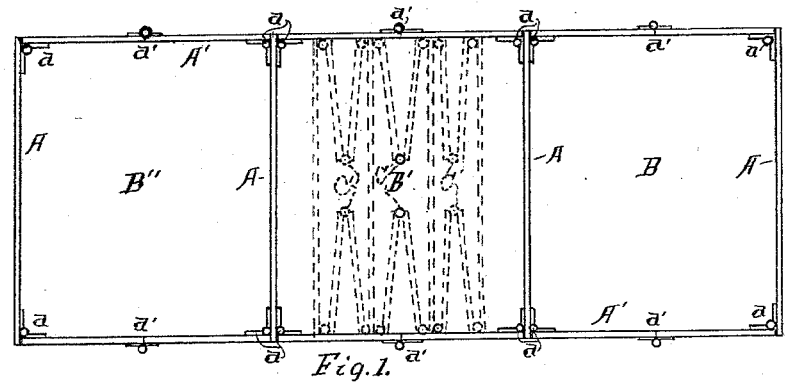
Figure 2:
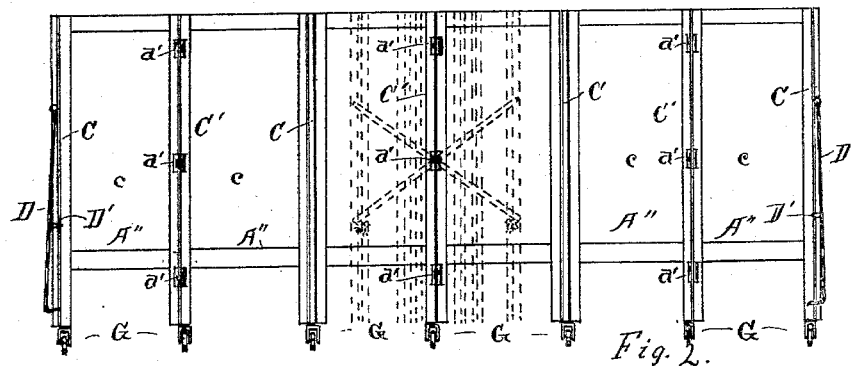
Figure 3:
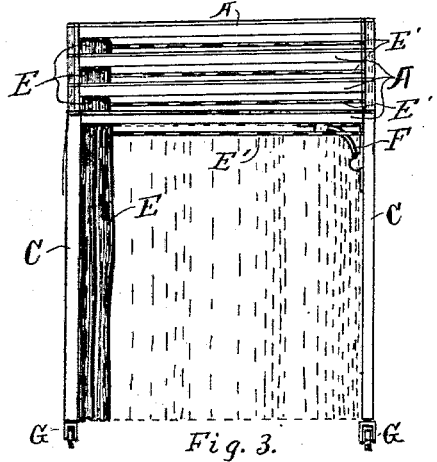

Figure 1 is a plan of my booth extended and showing its collapsed position in outline by the dotted lines. Fig. 2 is a side elevation of the same, and Fig. 3 is an end perspective of the same.

Similar letters refer to similar parts throughout the several views.

I construct my booths to be divided into several compartments, as B, B', and B'', the frame consisting of cross-bars A and side bars A' at the top, the side bars being pivoted to the cross-bars by hinges $a$ and divided midway between the pairs of cross-bars and pivoted to fold in, so that the sides of the frame will fold together to contract the frame longitudinally, so that it may be made to occupy but a relatively small space, as indicated by the dotted lines in Figs. 1 and 2. This top is supported upon posts C and C', which are connected and braced at their lower ends longitudinally of the booths by rails A'', so that with the hinges $a'$ interspersed along these posts, as shown in Fig. 2, and the hinges $a$ on the opposite sides of the posts C (not shown in Fig. 2, but indicated in Fig. 1) the sides of the booth will stand firmly to place when extended and may be readily folded when desired. The spaces $c$ may be filled with panels, or the frame may be covered with canvas, cretonne, plush, or any other desired material.

To facilitate the handling of the booths, I mount them upon casters G in the usual manner, and to hold the booth to position when collapsed for moving from place to place I place a long rigid hook D upon each outer post C, of sufficient length to cross at nearly right angles and hook into eyes D', as indicated by the dotted lines in Fig. 2. These hooks act a double purpose—first, to brace the frame to avert the danger of its falling over out of shape when being moved, and, second, they hold the frame extended far enough, so that it may be conveniently moved from place to place without danger of tipping over.

The frame is braced crosswise by the use of corner-braces F, securely attached to the posts and the cross-rails and of sufficient rigidity to avert the necessity of a bottom cross-rail to support the lower ends of the posts, so that the course through the booths longitudinally will be wholly without obstruction to entangle the feet of any person when passing through.

For dividing the booth into compartments I place curtains E at each end and division upon rods E', which are securely fastened to the posts at each end, acting the double purpose, first, of assisting to strengthen the frame sidewise, and, second, of a rod or guide upon which the curtains may be readily and conveniently slid to close the compartments, as indicated by the dotted lines in Fig. 3. To collapse the booths, draw the folds at C' together, as indicated by the dotted lines in Fig. 1, when the two ends may be pressed together and the frame contracted longitudinally to the desired space.

Having fully described my invention, what I claim as new, and desire to secure by Letters Patent, is—

1. A degree-booth constructed of side frames hinged to fold in alternate folds, and cross-bars connecting the upper ends of said sides at the ends and at each alternate intermediate fold, substantially as and for the purpose set forth.

2. A degree-booth constructed with two side frames composed of several sections pivoted to fold alternately, cross bars and braces for connecting the upper ends of the sides at each division-fold, rods across from side to side at each end and division, and curtains hung thereon to open and inclose the booths, substantially as and for the purpose set forth.

3. A degree-booth constructed with the sides consisting of several sections pivoted to fold alternately cross bars and braces to connect the upper ends of the sides at the ends and at the division-folds, curtains for inclosing and dividing the booth into compartments, and braces arranged to cross diagonally from end to end to hold and brace the frame when folded, substantially as, and for the purpose set forth.

N. H. REYNOLDS.

In presence of—
 ITHIEL J. CILLEY,
 WALTER S. ALLEN.